Dec. 17, 1929.  E. L. ENGELHARDT  1,740,010
PLANETARY TRANSMISSION
Filed May 9, 1929  2 Sheets-Sheet 1

INVENTOR.
E.L.Engelhardt
BY
Watson E Coleman
ATTORNEY.

Dec. 17, 1929.   E. L. ENGELHARDT   1,740,010
PLANETARY TRANSMISSION
Filed May 9, 1929   2 Sheets-Sheet 2

INVENTOR.
E. L. Engelhardt
BY
Watson E. Coleman
ATTORNEY.

Patented Dec. 17, 1929

1,740,010

UNITED STATES PATENT OFFICE

ELMER L. ENGELHARDT, OF DENVER, COLORADO

PLANETARY TRANSMISSION

Application filed May 9, 1929. Serial No. 361,701.

This invention relates to planetary transmissions and more particularly to an improvement of that type of planetary transmission wherein sun and orbit gears are provided which are engaged by an annular compound gear constituting the planet gear and having internal teeth which engage the sun gear, and external teeth to engage the orbit gear.

An important object of the invention is to provide in a device of this character construction such that the several gear elements are always maintained in their proper relation and, accordingly, clashing or slipping of the gear is avoided.

A further object of the invention is to provide a transmission of this character in which the maintainance of the gears in their proper positions is obtained in such a manner that the structure may be very readily and cheaply produced and readily assembled, and will be durable and efficient in service.

These and other objects I attain by the construction shown in the accompanying drawings wherein for the purpose of illustration I have shown a preferred embodiment of my invention and wherein:—

Figure 1:
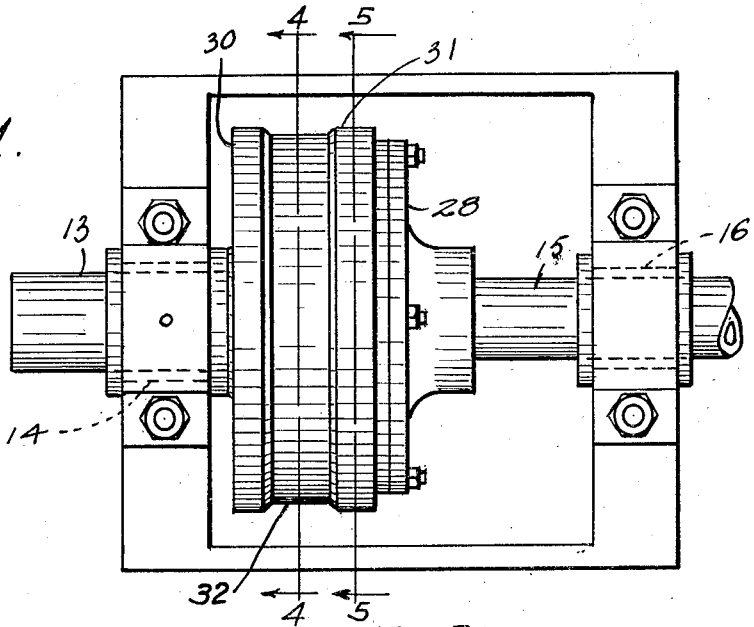
Figure 1 is a plan view of a transmission constructed in accordance with my invention, the brake band being removed.
Figure 2:
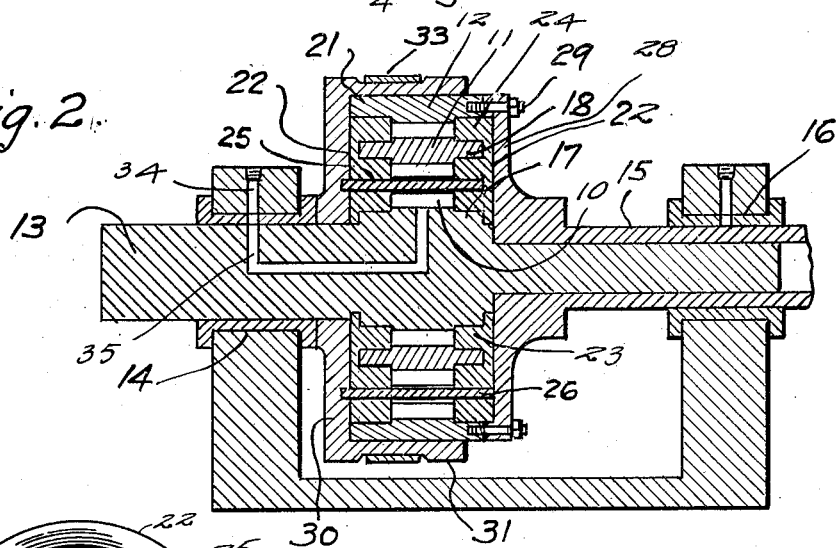
Figure 2 is a vertical longitudinal sectional view therethrough.
Figure 3:
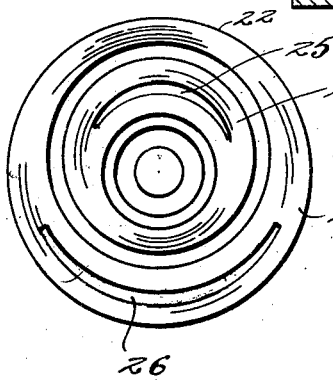
Figure 3 is an elevation of one of the side plates.

Referring now more particularly to the drawings, the numerals 10, 11 and 12 indicate respectively the sun planet and orbit gears of a transmission of the type above referred to. The sun gear 10, as at present shown, is formed upon a shaft 13, which is mounted in the bearing 14 at one end, and its opposite end has bearing in a sleeve 15, which in turn is mounted in a second bearing 16.

In accordance with my invention, I provide the gears 10, 11 and 12 at their side faces with projecting flanges. In the case of the sun gear, these flanges could be formed by the shaft 13, but I have in the present instance illustrated these flanges as produced by enlargements 17 of the shaft, which have an external diameter approximately that of the gear at the base of the teeth. The flanges 18 of the annular planet gear have an internal diameter the same as the diameter of the gear 11 at the base of the interior teeth 19 thereof, and an external diameter equal to the diameter of this gear at the base of the external teeth 20. The flanges 21 of the orbit gear 12 have an internal diameter equal to the diameter of this gear at the base of the teeth thereof and an external diameter the same as the exterior diameter of the gear.

Figure 4:
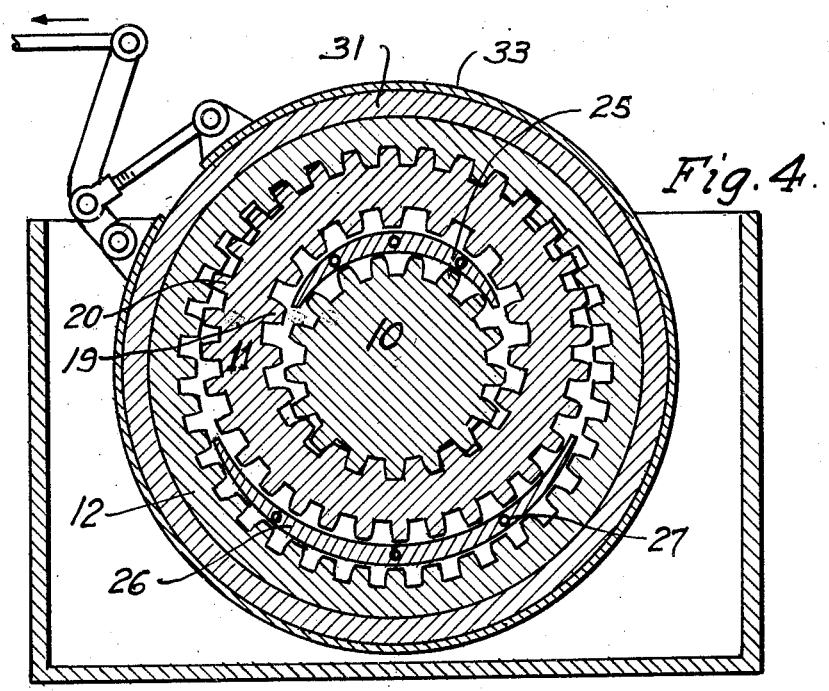
Figure 4 is a section on line 4—4 of Figure 1.
Figure 5:
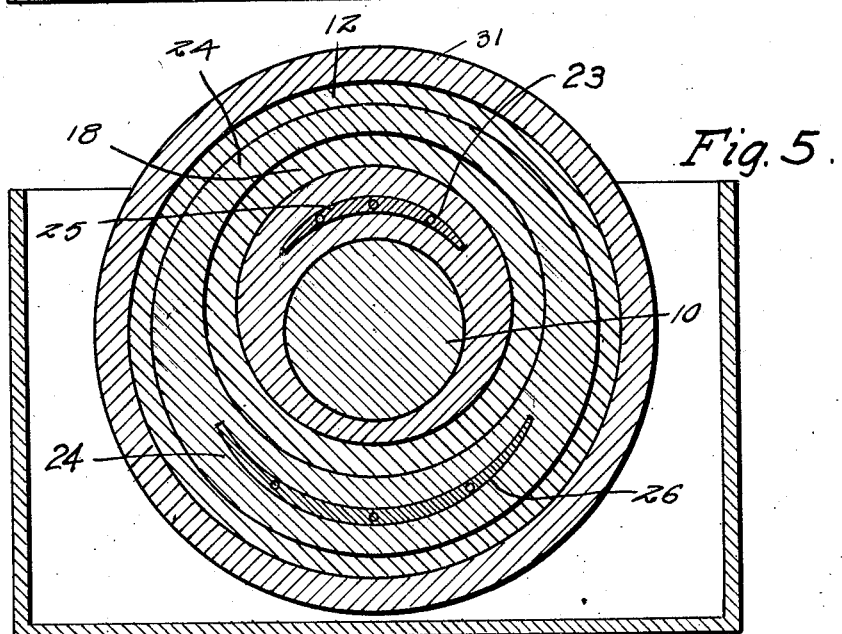
Figure 5 is a section on line 5—5 of Figure 1.

Abutting the outer faces of the flanges 17 and 18 and having their peripheral edges abutting against the inner face of the flanges 21 are plates 22, the inner faces of which are formed with annular bearings 23 and 24. Bearings 23 fit and fill the space between the flanges 17 and 18 at opposite sides of the gears and thus serve to maintain gear 11 in properly engaged position with the gears 10 and 12, and bearing 24 likewise insures proper placement of the gear 11 with relation to the gear 12 and accordingly, with relation to the gear 10. Either of these bearings could be eliminated while still maintaining the proper placement of the gear, but the use of both bearings eliminates liability to looseness which results in chattering as the bearings wear. As will be obvious from the inspection of Figure 4, in gearing of this type gaps are formed between the adjacent faces of the teeth of meshing gear elements at the opposite sides of these gears from the point of contact.

These gaps are crescent-shaped in form and I provide upon the bearings 23 and 24 of one of the plates projecting crescent-shaped webs 25 and 26 for extension through these openings to engage the bearings of the other of the plates. Securing elements may be directed through these webs, as indicated at 27, connecting the plates and bearings to one another to prevent relative rotation thereof. Here a further advantage of the use of the two bearings appears, as it will be obvious that the plates will be secured to one another at points diametrically opposed and lying at opposite sides of their center, and accordingly, the integrity of the connection is assured. One end of one flange 21 of the gear 12 and the plate 22 associated therewith, are abutted by a flange 28 formed upon the sleeve 15, and through this flange securing elements 29 are extended into the flange 21 to provide a connection so that gear 12 and sleeve 15 will rotate as a unit.

A housing element is provided, comprising a disc 30 mounted upon the shaft 13 and abutting the other of the plates 22, this housing element having a peripheral flange 31 slidably fitting against the outer face of the gear 12 and formed upon its outer face as a brake drum 32. A brake 33 may be associated with this flange to check rotation thereof. The disc 22 at the corresponding side is secured to disc 30 and may, if desired, be formed as a portion thereof. It will be obvious that when the brake 33 is applied and rotation of disc 30 checked, the bearing structure including plates 22 and bearings 23 and 24, will be held against rotation so that if shaft 13 is driven, a reduced speed of rotation of sleeve 15 will result, while if sleeve 15 is driven, an increased speed of operation of shaft 13 will result.

When the brake is released, however, the bearings and gears will rotate as a unit, and they will rotate as a unit unless the friction applied by the brake 33 is sufficient to hold the parts 30 and 31, with attached bearings 23 and 24, against rotation when a planetary action will result.

Attention is directed to the fact that the mounting of the bearings upon the plates 22 produces grooves upon the inner faces of these plates for the reception of the flanges of the respective gears, and that accordingly the structure might be readily produced by simply grooving the inner faces of the plates.

An arrangement of this character provides a sealed casing enclosing the gearing so that lubricant may be introduced to the casing. The lubricant is forced into the casing by means of a pump or the like, not shown, which is arranged in communication with an opening 34, which in turn communicates with a passage 35 formed in the shaft 13 and discharging with the casing.

Since the construction herein illustrated is capable of a very considerable range of change and modification without in any manner departing from the spirit of the invention, I accordingly do not limit myself to such specific structure except as hereinafter claimed.

I claim:—

1. In a planetary transmission and in combination with concentric sun and orbit gears and an eccentrically disposed annular compound planet gear surrounding the sun gear and meshing with each of the sun and orbit gears, a pair of plates concentrically mounted with respect to the sun gear and a bearing on each of said plates and having engagement with said planet gear in a manner preventing displacement of the axis thereof with relation to the axis of the sun gear, and means preventing relative rotation of the plates, the peripheral edges of said plates abutting the inner faces of projecting flanges at the sides of the orbit gear.

2. In a planetary transmission and in combination with concentric sun and orbit gears and an eccentrically disposed annular compound planet gear surrounding the sun gear and meshing with each of the sun and orbit gears, a pair of plates concentrically mounted with respect to the sun gear and an annular grooved bearing on each of said plates and having engagement with said planet gear in a manner preventing displacement of the axis thereof with relation to the axis of the sun gear, and a connection between said plates extending through the gearing within the confines of the space defined by the orbit gear, the peripheral edges of said plates abutting the inner faces of projecting flanges at the sides of the orbit gear.

3. In a planetary transmission and in combination with concentric sun and orbit gears and an eccentrically disposed annular compound planet gear surrounding the sun gear and meshing with each of the sun and orbit gears, a pair of plates concentrically mounted with respect to the sun gear and a bearing on each of said plates and having engagement with said planet gear in a manner preventing displacement of the axis thereof with relation to the axis of the sun gear, means preventing relative rotation of the plates, one of said plates having a peripheral flange slidably abutting the outer face of the orbit gear, and a brake band associated with said flange.

4. In a planetary transmission and in combination with concentric sun and orbit gears and an eccentrically disposed annular compound planet gear surrounding the sun gear and meshing with each of the sun and orbit gears, a pair of plates combining with the sun and orbit gears to produce a closed housing within which the planet gear is disposed, bearings upon said plates maintaining the planet gear in fixed relation to the sun and orbit gears while permitting relative rotation of such gears, and means holding said plates against relative rotation.

5. In a planetary transmission and in combination with concentric sun and orbit gears and an eccentrically disposed annular compound planet gear surrounding the sun gear and meshing with each of the sun and orbit gears, a pair of plates combining with the sun and orbit gears to produce a closed housing within which the planet gear is disposed, annular grooved bearings in said plates maintaining the planet gear in fixed relation to the sun and orbit gears while permitting relative rotation of such gears, means holding said plates against relative rotation, and brake means operable on said housing for holding the plates against rotation about the axis of the sun gear.

In testimony whereof I hereunto affix my signature.

ELMER L. ENGELHARDT.